United States Patent Office 3,692,463
Patented Sept. 19, 1972

3,692,463
DYEING SILK AND WOOL FIBERS IN AQUEOUS BATH OF METALLIZABLE FIBER-REACTIVE AZO DYES AND NITROGEN-CONTAINING POLYGLYCOLS WITH AFTER-TREATMENT USING METAL RELEASING AGENT
Gerhard Back, Loerrach, Germany, and Heinz Abel, Reinach, Arthur Buehler, Rheinfelden, and Alfred Litzler, Itingen, Switzerland, assignors to Ciba-Geigy AG
No Drawing. Filed Mar. 3, 1970, Ser. No. 16,208
Claims priority, application Switzerland, Mar. 10, 1969, 3,549/69
Int. Cl. C09b 45/04
U.S. Cl. 8—43           14 Claims

ABSTRACT OF THE DISCLOSURE

The present invention relates to a process for dyeing natural protein fibers, preferably wool, with metallizable fiber-reactive monoazo dyestuffs in the presence of a nitrogen-containing polyglycol compound. Upon after-treatment with metal-yielding agents dyeings of excellent wet and light fastness are obtained.

---

The present invention relates to a process for dyeing natural protein fibres. The process is characterised in that dyeing is carried out at temperatures of 80 to 110° C. with a metallisable, fibre-reactive monoazo dyestuff which in the ortho-positions on either side of the azo bridge carries groups capable of complex formation, and contains at least one sulphonic acid group which is not capable of complex formation and confers solubility in water and at least one fibre-reactive acylamino grouping which is derived from an aliphatic monocarboxylic acid with 2 to 4 carbon atoms or from a 5-membered to 6-membered heterocyclic structure, in the presence of a polyglycol-ether derivative of a monoamine or diamine, wherein at least one nitrogen atom is bound to a hydrocarbon radical of 16 to 22 carbon atoms, and that the dyestuff absorbed on the material to be dyed is subjected to an after-treatment with a metal-releasing agent.

The monoazo dyestuffs which are suitable for the present process correspond to the formula

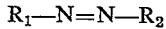

wherein $R_1$ denotes an aryl radical which in the o-position to the azo bridge carries a group capable of complex formation, and $R_2$ denotes the radical of a coupling component which couples in the adjacent position to a hydroxyl, keto or amino group, with the radicals $R_1$ and $R_2$ being so chosen that the resulting dyestuff contains at least one sulphonic acid group conferring solubility in water which is not capable of complex formation and at least one fibre-reactive acylamino grouping as defined above.

The dyestuffs of formula

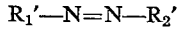

wherein $R_1'$ is the radical of a diazo component of the benzene or naphthalene series, especially a carboxybenzene, a hydroxybenzene or a naphthol radical, are particularly suitable. These radicals can possess the most diverse substituents, such as for example halogen atoms, amino, nitro, alkyl, alkoxy or acyl groups as well as acid groups which confer solubility in water and which are not capable of complex formation with the metal, for example carboxyl, sulphonic acid and sulphamide groups as well as β-sulphatoethyl-sulphone or β-sulphatoethyl-sulphamide groups. The amino groups mentioned are only introduced into the radical $R_1'$, or liberated, for example by reduction of a nitro group or by saponification of an acylamino group, after formation of the dyestuff.

The coupling component $R_2'$ is preferably a phenol, naphthol, naphthylamine or pyrazolone radical and may contain the same substituents as $R_1'$; furthermore $R_2'$ in most cases contains an amino group which can be acylated or is already acylated in the indicated manner.

The following groupings which are capable of forming the metal-dyestuff complex result from the substituents of $R_1'$ and $R_2'$: o,o'-dihydroxy-, o-hydroxy-o'-amino- or o-carboxy-o'-hydroxy-azo groups.

The dyestuffs for the present dyeing process can for example be obtained from the following diazo components and coupling components:

Diazo components 4- or 5-chlor-2-amino-1-hydroxybenzene, 4-, 5- or 6-nitro-2-amino-1-hydroxybenzene, 4,6-dichlor-2-amino-1-hydroxybenzene, 3,4,6-trichlor-2-amino-1 - hydroxybenzene, 4-chlor-5- or 6-nitro-2-amino-1-hydroxybenzene, 4-nitro-6-chlor-2-amino-1-hydroxybenzene, 6-nitro-4-methyl-2-amino-1-hydroxybenezene, 4-nitro-6-acetylamino - 2-amino-1-hydrobenzene, 6-nitro-4-acetylamino-2-amino-1-hydroxybenzene, 4,6-dinitro-2-amino-1-hydroxybenzene, 1-amino-2-hydroxynaphthalene, 2-aminobenzoic acid, 4- or 5-nitro-2-aminobenzoic acid, 5-acetylaminobenzoic acid, 2-aminobenzene-1-carboxylic acid-4- or -5-suphonic acid, 2-amino-1-hydroxybenzene-4- or -5-sulphonic acid, 4-chlor- or 4-methyl-2-amino-1-hydroxybenzene-5- or -6-sulphonic acid, 4-nitro-2-amino-1-hydroxybenzene-6-sulphonic acid, 6-nitro-2-amino-1-hydroxybenzene-4-sulphonic acid and above all naphthalene compounds such as 2-amino-1-hydroxynaphthalene-4- or -8-sulphonic acid, 6-brom- or 6-methyl-1-amino-2-hydroxynaphthalene-4-sulphonic acid, and especially 1-amino-2-hydroxynaphthalene-4-sulphonic acid or 6-nitro-1-amino-2-hydroxynaphthalene-4-sulphonic acid; furthermore, 4-chlor- or 4-nitro-2-amino-1-hydroxybenzene-6-sulphonic acid amide, 6-nitro-2-amino-1-hydroxybenzene-4-sulphonic acid amide, 2-amino-1-hydroxybenzene-4- or -5-sulphonic acid amide, 2-amino-1-hydroxybenzene-4- or -5-sluphonic acid phenylamide, 2-amino-1-hydroxybenzene-4- or -5-sulphonic acid monomethylamide or dimethylamide, -N-β-sulphato-ethylamide, 4-methyl-2-amino-1-hydroxybenzene-5-sulphonic acid amide, 4-chlor-2-amino-1-hydroxybenzene-5 - sulphonic acid methylamide, ethylamide, isopropylamide or phenylamide, 4-chlor-2-amino-1-hydroxybenzene-5 - sulphonic acid dimethylamide, diethylamide, N-methyl-N-phenylamide, N-methyl-N-β-hydroxyethylamide, N-β-hydroxyethyl-N-phenylamide or N-ethyl-N-phenylamide and the corresponding compounds which instead of a sulphonic acid amide group possess a methylsulphone group, an ethyl sulphone group and especially a phenylsulphone group, a p-methyl- or p-chlorophenylsulphone group or a β-sulphatoethylsulphone group.

Coupling components

Hydroxybenzenes such as in p-cresol or p-tertiary amylphenol, 4-methyl - 2-acetylamino-1-hydroxybenzene, 4 - acetylamino - 1 - hydroxybenzene, 4-(β-cyanethyl)-phenol, β-ketocarboxylic acid esters or amides, such as acetoacetic acid anilide and 1-acetoacetylamino-2-, -3-, or -4-chlorobenzene, 1 - acetoacetylamino - 4 - acetylamino-benzene, pyrazolones such as 1-phenyl-3-methyl-5-pyrazolone, 1,3-diphenyl-5-pyrazolone, 1-(2'-, 3'- or -4'-chlorophenyl)-3-methyl-5-pyrazolone, 1-(2'-, 3'- or 4'-methylphenyl)-3-methyl-5-pyrazolone, 1 - (2',5'-dichlorophenyl)-3-methyl-5-pyrazolone, 1-(2'-ethyl- or 4'-ethyl-phenyl)-3-methyl-5-pyrazolone, 1 - (naphthyl - (1')- or -(2') - 3 - methyl-5-pyrazolone, 1-phenyl-5-pyrazolone-3-carboxylic acid phenylamide, 1-n-octyl-3-methyl-5- pyrazolone, hydroxyquinolines, barbituric acid and naphthylamines such as 6-brom-, 6-methoxy- or 6-methyl-2-aminonaphthalene, 2 - phenyl - aminonaphthalene, 2-aminonaphthalene itself and the 2-aminonaphthalene-1-sulphonic acid which is known to lead to the same dyestuffs as 2-aminonaphthalene and can be coupled with the $SO_3H$ group located in the 1-position being split off, but above all naphthols such as 6-bromo- or 6-methoxy-2-hydroxynaphthalene and especially 1-acetylamino-7-hydroxynaphthalene, 1 - n - butyryl-amino-7-hydroxynaphthalene, 1-benzoylamino-7-hydroxynaphthalene, 1-carbethoxyamino-7-hydroxynaphthalene, 8 - chloro - 1-hydroxynaphthalene, 5 - chloro - 1-hydroxynaphthalene, 5,8-dichloro - 1 - hydroxynaphthalene, 4,8- or 5,8-dichloro-2-hydroxynaphthalene, 2-hydroxynaphthalene and optionally 1 - hydroxynaphthalene, 1 - phenyl-3-methyl-5-pyrazolone - 2'-, 3'- or -4'-sulphonic acid, 2'-chloro-1-phenyl - 3 - methyl-5-pyrazolone-4'- or -5'-sulphonic acid, 2',5' - dichloro - 1-phenyl-3-methyl-5-pyrazolone-4'-sulphonic acid, 1-[naphthyl-(1')]-3-methyl-5-pyrazolone-4'-, -5'-, -6'-, -7'- or -8'-sulphonic acid, 1-[naphthyl-(2')]-3-methyl-5-pyrazolone-6'- or -8'-sulphonic acid, 1-acetoacetylaminobenzene-4-sulphonic acid and above all 2-amino- or 2-hydroxynaphthalene-4-, -5-, -6- or -7-sulphonic acid, 1-hydroxynaphthalene-4-, -5-, or -8-sulphonic acid, 2-phenylaminonaphthalene-3'- or -4'-sulphonic acid, 1-phenyl-3-methyl-5-pyrazolone-3'-sulphonic acid amide, -3'-sulphonic acid methylamide or -3'-sulphonic acid-β-hydroxyethylamide, amides of 2-aminonaphthalene-4-, -5- or -6-sulphonic acid, of 1-hydroxynaphthalene-4-, -5-, or -8-sulphonic acid or of 2-hydroxynaphthalene-4-, -5-, -6- or -7-sulphonic acid, and also coupling components containing amino groups such as 1 - (3' - or 4'-amino-phenyl)-3-methyl-5-pyrazolone, 4-amino-1-acetoacetylaminobenzene and especially aminonaphthols such as 1-amino-8-hydroxynaphthalene-3,6- or -4,6-disulphonic acid, 1-hydroxy-5-, -6- or 7-aminonaphthalene - 3 - sulphonic acid, 1-amino - 8 -naphthol-4-sulphonic acid, aminobenzoyl-H- and -K- acids, and also coupling components such as for example 1-hydroxy-5-β-chloropropionylaminonaphthalene-3 - sulphonic acid, 1-α,β - dibromopropionylamino - 8 - hydroxynapthalene-3,6-disulphonic acid, 2-α,β-dibromopropionylamino-6-hydroxynaphthalene-8-sulphonic acid and 2-hydroxy-6-chloroacetylaminonaphthalene - 8 - sulphonic acid. The dyestuff formation from diazo components and coupling components takes place according to known methods of azo coupling.

Possible suitable fibre-reactive acylating agents are preferably aliphatic and the heterocyclic acylating agents, such as for example α,β-dibromopropionic acid chloride or bromide, chloracetyl chloride, β-chloropropionic acid chloride, α- or β-bromacrylic acid chloride, acrylic acid chloride, chlorocrotonic acid chloride, propionic acid chloride and, as heterocyclic acylating agents, especially dihalogeno-1,3,5-triazines which can contain a further substituent, for example bonded via an oxygen, sulphur or nitrogen atom, on the hetero-ring. As alicyclic compounds, those acylation products which contain a tetrafluorocyclobutane radical may be mentioned.

In the dyestuffs which are acylated as indicated and possess a β-chloropropionyl, α,β-dichloropropionyl or dibromopropionyl radical, these radicals can be converted into the corresponding unsaturated acyl radicals by splitting off hydrogen halide by means of agents which react alkaline.

Conversion of the monoazo dyestuffs into their metal complexes takes place in an after-treatment following the actual dyeing process. This after-treatment can be carried out in the dye bath itself or in a separate bath.

Suitable complex-forming metals are, for example, copper and nickel, or especially chromium and cobalt. The metals are brought into contact with the dyed fibres in the form of aqueous solutions of their salts. Amongst others, the appropriate sulphates, nitrates, formates and acetates are suitable, and additionally suitable agents for introducing chromium are chromium-(III) fluoride, potassium chromium sulphate, potassium chromium thiocyanate and the chromates or bichromates, the latter optionally mixed with other salts such as, say, ammonium sulphate.

In order to prevent precipitation of sparingly soluble metal salts in the dye bath, complex-forming agents which promote solubility, such as tartaric acid, citric acid, salicylic acid or lactic acid can be added. The amount of the metal-releasing agent is so chosen that at least one metal atom is present per two molecules of monoazo dyestuff. An excess of metal is however advantageously used, ratios of 6 to 20 metal atoms per 2 molecules of dyestuff being possible.

As levelling agents it is possible to employ both non-ionic and also ionic, that is to say anionic and cationic, nitrogen-containing compounds in the process according to the invention.

Advantageously, polyglycol-ether derivatives of long-chain monoamines or diamines are used, with at least one nitrogen atom being bound to the hydrocarbon radical of a long-chain fatty acid; furthermore, these adducts can also be quaternised at a nitrogen atom or esterified at the end of a polyglycol chain with a polybasic acid, or be both quaternised and esterified.

As starting substances, single-substance higher molecular alkylamines, or amine mixtures, such as are obtained on conversion of natural fatty acid mixtures, for example tallow fatty acid, into the corresponding amines, are used. Amines with 16 to 22 carbon atoms to which at least 5 to 10 and not more than 60 to 70 mols of ethylene oxide are added on, are suitable. The following may be mentioned individually as amines: hexadecylamine, octadecylamine, arachidylamine $CH_3(CH_2)_{19}$—$NH_2$, behenylamine $CH_3(CH_2)_{21}$—$NH_2$, octadecenylamine and N-alkylpropylenediamines with the appropriate hydrocarbon radicals.

Both the quaternisation and the esterification of the nitrogen-containing polyglycol-ether derivatives are advantageously carried out according to known methods, no intermediate isolation being necessary.

Customary alkylating or aralkylating agents, such as dimethyl sulphate, ethyl bromide or benzyl chloride, can be employed for the quaternisation; however, chloroacetamide, ethylene chlorhydrin, ethylene bromohydrin, epichlorhydrin or epibromohydrin are preferred as quaternising agents.

Organic polycarboxylic acids, such as for example maleic acid, or polybasic inorganic oxygen acids, such as phosphoric acid or sulphuric acid, can serve as polybasic oxygen acids for the formation of the acid esters. Instead of the acids it is possible to use ther functional derivatives, such as acid anhydrides, acid halides, acid esters or acid amides. According to a particularly preferred embodiment, the acid sulphuric acid esters are directly manufactured in the form of their ammonium salts by warming the starting substances with amidosulphonic acid in the presence of urea. Both the quaternisation and the partial esterification are appropriately carried out by simple mixing of the reagents with warming, appropriately to a temperature of between 50 and 100° C.

As particularly advantageous levelling agents there may be mentioned: the addition product of oleylamine and 8 mols of ethylene oxide and the mixture of (a) an adduct of 1 mol of tallow fatty amine (consisting of 30% of hexadecylamine, 25% of octadecylamine and 45% of octadecenylamine) and 7 mols of ethylene oxide, quaternised with chloracetamide, and (b) the ammonium salt of the acid sulphuric acid ester of the same non-quaternary adduct, as well as the individual components (a) and (b) of the mixture mentioned.

The amount of levelling agent in the dye baths is about 0.5 to 2% of the fibre weight, depending on the amount of dyestuff employed.

Further additives which can be present in the dye bath are for example thickeners, salts and acids. The thickeners should be stable in an acid medium and should also not be destroyed by the presence of a metal-releasing agent. Such thickeners are, for example, British gum or etherified carubic acids. It is appropriate to use sodium sulphate, ammonium sulphate, sodium chloride or primary and secondary phosphates as salts, and aliphatic monocarboxylic or dicarboxylic acids which in addition to the carboxy carbon atom possess at most 4 carbon atoms in the aliphatic chain, as acids. However, only the aliphatic monocarboxylic acids, such as formic acid or acetic acid, are of practical significance.

The amount of acid in the dye bath is 2 to 8% of the fibre weight, depending on the amount and nature of the dyestuff.

Natural nitrogen-containing fibres can be dyed according to the present process. Silk and above all wool may be mentioned. Any desired state of processing of the fibre material can be chosen. Particularly good results are however achieved on dyeing unwoven wool, such as loose wool, combed tops or yarn, but woven fabrics of the fibre materials mentioned are also dyed with good results.

According to the invention, the dyestuffs are applied from acid aqueous preparations according to the exhaustion process. The dyeing temperatures lie between about 80 and 110° C. The metallising agent is added to the bath, cooled to 60 to 80° C., after the dyestuff has already been practically completely absorbed on the fibre. Thereafter the bath is again brought to the boil or to temperatures above the boil, in the latter case the procedure being carried out in pressure vends, and the dyeing process is finished.

After the dyeing the dyed goods are rinesd hot and cold or, if called for by the end use of the dyed material, soaped in the presence of non-ionic dispersing agents and/or wetting agents as well as dilute ammonia solution, in the course of which parts of the dyestuff which may possibly not have been adequately fixed are removed. Dyeings of excellent wet fastness and light fastness are obtained.

Any desired colour shades can be obtained according to the present process, but above all dark shades such as navy blue or black.

In the examples which follow the parts, unless otherwise stated, denote parts by weight and the percentages denote percentages by weight.

EXAMPLE 1

The following dye bath is prepared in a circulation apparatus: 2000 l. of soft water, 3000 g. of ammonium sulphate, 4000 g. of 80% strength acetic acid, 2000 g. of In the examples which follow, the parts, unless otherwise stated, adduct of 1 mol of tallow fatty amine and 7 mols of ethylene oxide, quaternised with chloracetamide, and (b) the ammonium salt of the acid sulphuric acid ester of the same, non-quaternised, adduct, and 6000 g. of the dyestuff of formula (1) 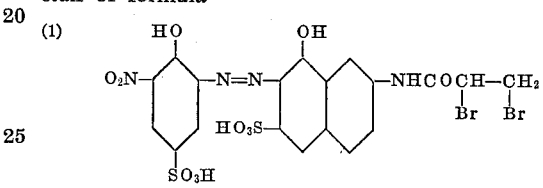

The material carrier, with 100 kg. of loose wool, is introduced into this bath. After about 10 minutes the temperature of the dye bath is increased, brought to the boil in 30 minutes and kept at this temperature for 30 minutes. It is then cooled to 80° C. and 2000 g. of potassium bichromate are introduced into the bath. The bath is again heated to the boil and after one hour at this temperature the dyeing is finished. Thereafter the goods are rinsed warm and cold, centrifuged and dried. A level, very fast dyeing of the wool results.

Instead of the abovementioned dyestuff, the following dyestuffs and metal-releasing agents can also be used, with equally good results.

| No. | Metal-free dyestuff | Metal salt used for the aftertreatment | Shade on woven wool fabric |
|---|---|---|---|
| 2 | (structure with O₂N-, HO, HO₃S-, HO, NHCOCH-CH₂ with Br Br, -SO₃H) | Cobalt sulphate<br>Potassium bichromate | Dark blue.<br>Blue-grey. |
| 3 | (structure with HO, HO₃S-, Cl, HO, -N=N-, NHCOCH-CH₂ with Br Br) | Copper sulphate<br>Nickel sulphate | Claret.<br>Red. |
| 4 | (structure with O₂N-, HO, HO₃S-, HO, -N=N-, NHCOCH-CH₂ with Br Br) | Copper sulphate<br>Sodium chromate | Violet.<br>Black. |
| 5 | (structure with HO₃S-, OH, HO₃S-, O₂N, HO, -N=N-, NHCOCH-CH₂ with Br Br) | Potassium bichromate | Blue-black. |
| 6 | (structure with HO₃S-, HO, HO, -N=N-, CH₂NHCOCH₂Cl) | Cobalt acetate<br>Potassium chromium thiocyanate | Violet.<br>Dark blue. |

| No. | Metal-free dyestuff | Metal salt used for the aftertreatment | Shade on woven wool fabric |
|---|---|---|---|
| 7 | HO–⟨⟩–N=N–⟨naphthyl(HO, HO₃S)⟩–NHCOCH=CH₂, with O₂N on first ring | Nickel acetate / Chromium fluoride | Dark brown. / Black. |
| 8 | HO₃S–⟨naphthyl(OH)⟩–N=N–⟨naphthyl(HO, HO₃S)⟩–NHCOC(Br)=CH₂ | Copper sulphate / Potassium bichromate | Violet. / Navy blue. |
| 9 | HO₃S–⟨naphthyl(OH), O₂N⟩–N=N–⟨naphthyl(HO, HO₃S)⟩–NHCOC(Br)=CH₂ | Cobalt acetate / Potassium bichromate | Brown-violet. / Green-black. |
| 10 | COOH–⟨⟩(HO₃S)–N=N–⟨naphthyl(HO)⟩–NHCOCHBr–CH₂Br | Nickel sulphate / Chromium acetate | Red. / Claret. |
| 11 | HO–⟨⟩(HO₃S, H₃CO)–N=N–⟨naphthyl(HO, HO₃S)⟩–NHCOCHBr–CH₂Br | Copper sulphate / Potassium chromate | Red-violet. / Blue-grey. |
| 12 | HO–⟨⟩(O₂N)–N=N–⟨naphthyl(H₂N, HO, SO₃H)⟩–with ClCH₂CONHH₂C substituent | Cobalt acetate / Potassium bichromate | Do. / Olive. |
| 13 | COOH–⟨⟩(HN–CO–CHBr–CH₂Br)–N=N–C(HO)=C(CH₃)–C(=N)–N–⟨⟩(Cl, Cl, SO₃H) (pyrazolone) | Nickel sulphate / Chromium acetate | Brown-yellow. / Yellow. |
| 14 | HO–⟨⟩(O₂N, Cl)–N=N–⟨naphthyl(HO, HO₃S)⟩–HNCOCHBr–CH₂Br | Potassium chromium thiocyanate. | Black. |
| 15 | HO₃S–⟨⟩(HO, O₂N)–N=N–⟨⟩(HO)–HNCOCHBr–CH₂Br | Potassium bichromate | Brown |

| No. | Metal-free dyestuff | Metal salt used for the aftertreatment | Shade on woven wool fabric |
|---|---|---|---|
| 16 | [structure: nitro-hydroxy phenyl-N=N-hydroxy naphthyl with SO₃H, NHCOCH(Br)-CH(Br)-CH₃] | Potassium chromium tartrate. | Browns |
| 17 | [structure: nitro-hydroxy phenyl-N=N-hydroxy naphthyl with HO₃S, SO₃H, NHCO-phenyl-NH-CO-CHBr-CH₂Br] | Cobalt sulphate............ Potassium chromate....... | Dark blue. Dark green. |
| 18 | [structure: hydroxy phenyl with SO₂NH-CH₂CH₂OSO₃H -N=N- hydroxy naphthyl with SO₃H, NHCOCH(Br)-CH(Br)-CH₃] | Potassium bichromate...... | Violet-grey. |
| 19 | [structure: COOH, HN-CO-CHBr-CH₂Br substituted phenyl -N=N-C(CH₃)=C(OH)-...-O=C-NH-phenyl-SO₃H] | Nickel sulphate............ Chromium acetate......... | Yellow. Do. |
| 20 | [structure: HO₃S, Cl substituted hydroxyphenyl -N=N- pyrazolone ring with CH₃, C=N, N-phenyl-NHCO-CH₂Cl] | Cobalt acetate............ Potassium bichromate..... | Brown-red. Red. |
| 21 | [structure: dinitro-hydroxy phenyl -N=N- hydroxy naphthyl with HO₃S, NHCOCHBr-CH₂Br] | Potassium bichromate..... | Black. |
| 22 | [structure: dinitro-hydroxy phenyl -N=N- hydroxy naphthyl with HO₃S, NHCOCH=CH₂] | ......do...................... | Do. |
| 23 | [structure: dinitro-hydroxy phenyl -N=N- hydroxy naphthyl with HO₃S, SO₃H, NHCO-phenyl-NHCO-CHBr-CH₂Br] | Copper sulphate........... Chromium acetate......... | Grey. Black. |
| 24 | [structure: HN-CO-CH₃, NO₂ substituted hydroxyphenyl -N=N- hydroxy naphthyl with HO₃S, SO₃H, NHCO-phenyl-NH-CO-CH₂Cl] | Cobalt acetate............ Chromium acetate......... | Grey. Green-grey. |

| No. | Metal-free dyestuff | Metal salt used for the aftertreatment | Shade on woven wool fabric |
|---|---|---|---|
| 25 | 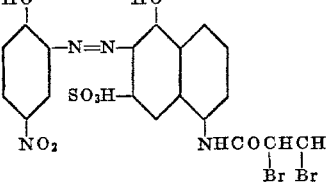 | Copper sulphate<br>Chromium fluoride | Violet-grey.<br>Black. |
| 26 | 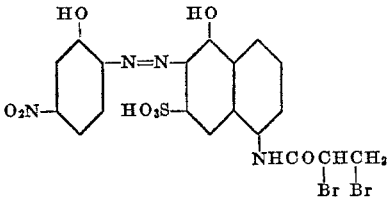 | Potassium bichromate | Blue-black. |
| 27 | 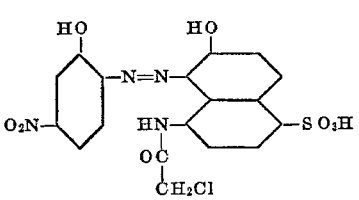 | Potassium chromate tartrate. | Grey-black. |
| 28 | 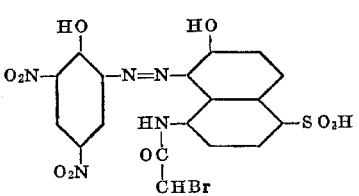 | Potassium bichromate | Black-green. |
| 29 | 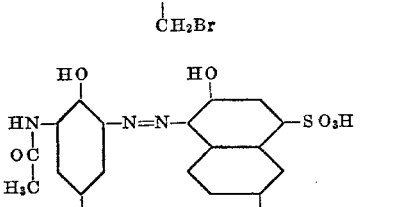 | Copper acetate<br>Chromium acetate | Blue-grey.<br>Black. |
| 30 | 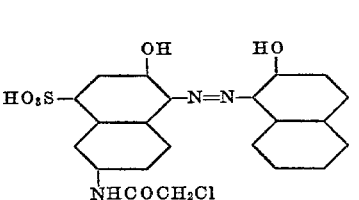 | Cobalt acetate<br>Chromium fluoride | Violet.<br>Navy blue. |
| 31 | 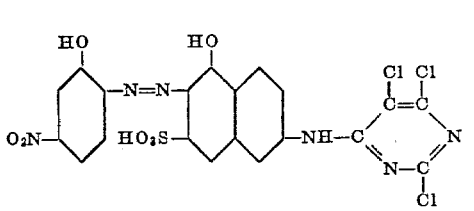 | Potassium bichromate | Blue-grey. |
| 32 | 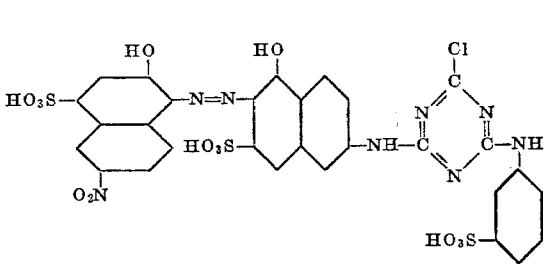 | Potassium chromium thiocyanate. | Green-grey. |

| No. | Metal-free dyestuff | Metal salt used for the aftertreatment | Shade on woven wool fabric |
| --- | --- | --- | --- |
| 33 | 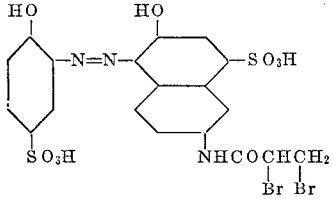 | Copper acetate. Chromium fluoride. | Red-violet. Violet-grey. |
| 34 | 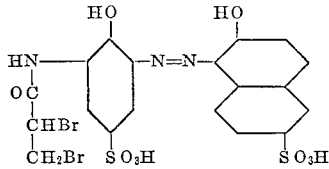 | Copper acetate. Cobalt acetate. | Claret. Violet-red. |
| 35 | 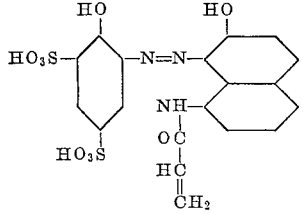 | Cobalt sulphate. Potassium chromium tartrate. | Violet-grey. Blue-grey. |

EXAMPLE 2

100 kg. of wool tops in the form of pressed bobbins are introduced, by means of a customary material carrier, into the dyeing part of a unit for dyeing tops. The following liquor is prepared in the batch container: 1500 l. of soft water, 3000 g. of 80% strength acetic acid, 1000 g. of 85% strength formic acid, 2000 g. of ammonium sulphate, 2000 g. of the adduct of 1 mol of oleylamine and 8 mols of ethylene oxide and 6000 g. of the dyestuff of formula (36)

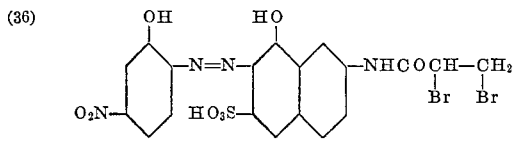

This liquor is warmed to about 50° C. and then pumped into the dyeing apparatus.

It is warmed to 80° C. in 20 minutes and dyeing is carried out until the bath is largely exhausted, which is the case after about one hour. The exhaustion of the dye bath can, where appropriate, be assisted by further addition of acid.

2000 g. of cobalt acetate are then added to the dye bath and the dye bath is heated to the boil in 20 minutes and kept at this temperature for one hour. Thereafter the goods are rinsed, centrifuged and dried. A level, fast-dyeing of the wool, in a violet-black shade, results.

EXAMPLE 3

4 parts of 80% strength acetic acid, 2 parts of the ammonium salt of the acid sulphuric acid ester of the adduct of a fatty amine (consisting of 30% of hexadecylamine, 25% of octadecylamine and 45% of octadecenylamine) and 7 mols of ethylene oxide and 5 parts of the dyestuff No. 21 of the table are successively dissolved in 4000 parts of water at 50° C. After introducing 100 parts of prewetted wool yarn into the dye bath, the temperature of the dye bath is raised to 80° C. in 30 minutes and kept at this temperature for a further 30 minutes. After this time the dyestuff has been completely absorbed on the goods to be dyed. After adding 2.5 parts of potassium bichromate, the dye bath is kept at 80 to 85° C. for a further 60 minutes. The pH value of the bath is then adjusted from 4.5 to about 8.5 by adding a concentrated ammonia solution and the treatment is continued for a further 20 minutes at 80° C. The dyed material is well rinsed, acidified where appropriate, and dried. A very fast, reddish-tinged black dyeing results.

EXAMPLE 4

100 parts of prewetted, loose wool are introduced, in a pressure dyeing apparatus, into 1500 parts of a dye bath at 50° C., which contains 5 parts of 80% strength acetic acid, 2 parts of the adduct of a fatty amine (consisting of 30% of hexadecylamine, 25% of octadecylamine and 45% of octadecenylamine) and 30 mols of ethylene oxide and 5 parts of the dyestuff No. 23 of the table. The dye bath is heated to 106° C. over the course of 30 minutes and is kept at this temperature for a further 30 minutes. After cooling to about 80° C., 2.5 parts of chromium acetate are added in the form of an aqueous solution. The dye bath is again heated to 106° C. and kept at this temperature for a further 60 minutes. After cooling to 80° C., the dyed goods are thoroughly rinsed, centrifuged and dried. They are dyed in a fast, deep shade of black.

EXAMPLE 5

100 parts of prewetted non-weighted natural silk yarn are introduced into a dye bath of 4000 parts of water at 50° C., 4 parts of 80% strength of acetic acid, 1 part of the adduct of tallow fatty amine and 7 mols of ethylene oxide, quaternised with chloracetamide and esterified with amidosulphonic acid/urea, whereupon the ammonium salt of the acid sulphuric acid ester of the quaternised adduct results, and 2.5 parts of the dyestuff of Formula 1 used in Example 1. The dye bath is warmed to 80° C. over the course of 30 minutes and is kept at this temperature for a further 30 minutes. 1.5 parts of potassium chromate in a dissolved form are added to the almost completely exhausted bath, after which it is kept for a further 60 minutes at 80° C. The dyed goods are then withdrawn, rinsed and dried. They are dyed in a fast, level blue-grey shade.

EXAMPLE 6

4 parts of 80% strength acetic acid, 1 parts of the adduct of tallow fatty amine and 70 mols of ethylene oxide and 2 parts of the dyestuff No. 30 of the table are distributed in 4000 parts of water at 50° C. After introducing 100 parts of prewetted wool yarn, the dye bath is warmed to 80° C. over the course of 30 minutes, left for about 20 minutes at this temperature, then heated to the boil and kept at the boil for a further 30 minutes. The dyestuff is completely absorbed on the goods to be dyed. The bath, cooled to 80–85° C., is treated with 2 parts of cobalt acetate in a dissolved form, again raised to the boil, and kept at this temperature for a further 30 minutes. After cooling to 80° C., it is adjusted to a pH value of 8.5 with ammonia solution and an aftertreatment at 80° C. is carried out for 20 minutes. The dyed goods are subsequently well rinsed, centrifuged and dried. A fast level dyeing in a violet shade results.

We claim:

1. A process for dyeing silk and wool fibers which comprises treating the fibers, at a temperature between 80 and 110° C. with a bath comprising
   (a) a monoazo or disazo dyestuff which contains,
       (i) for metal-complexing activity, a group selected from o,o'-dihydroxy-azo, o-hydroxy-o'-aminoazo, and o-carboxy-o'-hydroxy-azo
       (ii) at least one sulfonic acid group which is not capable of complex formation and which confers water solubility to the dystuff and
       (iii) a fiber-reactive acylamino group where the acyl group is derived from a $C_2$ to $C_4$ aliphatic monocarboxylic acid or halogenated triazine
   (b) a levelling agent comprising a poly(alkylene) glycol-ether derivative of a $C_{16}$ to $C_{22}$ alkylmonoamine or diamine, and therefater treating said fibers with a metal-releasing agent.

2. Process according to claim 1 in which monoazo dyestuffs of formula $$R_1—N=N—R_2$$

are used, wherein $R_1$ denotes a benzene or naphthalene radical which in the ortho-position to the azo bridge carries a group capable of complex formation and $R_2$ denotes the radical of a coupling component selected from phenol, naphthol, naphthylamine and pyrazolone which couples in the adjacent position to the hydroxyl, keto or amino group, with the radicals $R_1$ and $R_2$ being so chosen that the resulting dyestuff contains at least one sulphonic acid group which confers solubility in water and is not capable of complex formation, and at least one acylamino grouping.

3. A process according to claim 2 which comprises treating silk or wool fibers at a temperature between 80 and 110° C. with an aqueous bath comprising
   (a) a monoazo dyestuff of the formula

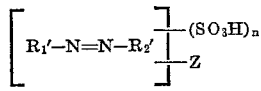

in which
   $R_1'$ is a benzene or naphthalene radical which in the ortho-position to the azo bridge carries an —OH or —COOH group, $R_1'$ being unsubstituted or substituted by one or more of halogen, amino, nitro, alkyl, alkoxy, sulphamide, sulphamyl, sulphamyl substituted by methyl, ethyl, phenyl and β-hydroxyethyl, acetylamino, β-sulphatoethylsulphone or β-sulphatoethylsulphamide,
   $R_2'$ is the radical of a coupling component selected from phenol, napthol and pyrazolone which couples in the adjacent position to the hydroxyl group, $R_2'$ being unsubstituted or substituted by one or more of halogen, amino, nitro, alkyl, alkoxy, sulphamide, sulphamyl, cyanoethylene, phenyl, carboxylic acid phenylamide, acetyl-amino, n-butyryl amino, carbethoxy amino and phenylamino,
   $n$ is a whole number of from 1 to 3
   Z is one of
       (i) —[B]$_m$—NH—CO—Y where B is —CH$_2$—,
       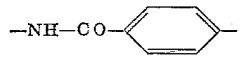
       or
       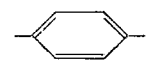
       $m$ is 0 or 1 and Y is
       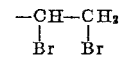
       —CH=CH$_2$, —CH$_2$Cl
       or
       or
       (ii) chlorotriazinylamino or chloropyrimidylamino,
   (b) a levelling agent comprising a poly(alkylene) glycolether of a $C_{16}$ to $C_{22}$ alkylmonoamine or diamine containing 5 to 70 —CH$_2$—CH$_2$—O— groups, and thereafter treating the fibers with a metal releasing agent.

4. A process according to claim 3 in which Z is the group —[B]$_m$—NH—CO—Y where $m$ is 0.

5. A process according to claim 3 in which $R_1'$ and $R_2'$ is each, independently, unsubstituted or substituted by one or more of nitro, chlorine, methoxy, phenyl, amino, β-sulphatoethylsulphamide or acetylamino.

6. Process according to claim 2, in which monoazo dyestuffs are used in which the coupling component $R_2$ contains a fibre-reactive acylamino grouping.

7. Process according to claim 1 in which monoazo dyestuffs of formula $$R_1'—N=N—R_2'$$

are used, wherein $R_1'$ denotes a carboxybenzene radical, phenol radical or naphthol radical and $R_2'$ denotes a phenol radical, naphthol radical or pyrazolone radical, with the radicals $R_1'$ and $R_2'$ being so chosen that the resulting dyestuff contains at least one sulphonic acid group which is not capable of complex formation, and at least one fibre-reactive acylamino grouping.

8. Process according to claim 1 in which the fiber-reactive group is chloracetylamino, 2-bromacrylamino, 2,3-dibromopropionylamino or chlorotriazinylamino.

9. Process according to claim 1 in which the polyethylene glycol-ether derivatives of a $C_{16}$ to $C_{22}$ fatty acid amine containing 5 to 70 —CH$_2$CH$_2$—O— groups in the molecule, are used as levelling agents.

10. Process according to claim 1, in which a mixture of polyethylene glycol-ether derivatives of fatty acid amines with 16 to 22 carbon atoms, which contain 5 to 10 —CH$_2$—CH$_2$—O— groups in the molecule, with a part of the nitrogen-containing polyglycol-ether derivatives being quaternised at the amine nitrogen atom and the other part being esterified with a polybasic acid at the end of the polyglycol chain, is used as the levelling agent.

11. Process according to claim 10, in which quaternising agents containing chlorine are used.

12. Process according to claim 10, in which suphuric acid or a sulphuric acid derivative is used as the polybasic acid.

13. Process according to claim 1, in which the dyestuff absorbed on the mateiral to be dyed is after-treated with a chromium or cobalt compound.

14. Process according to claim 1, in which wool is dyed.

References Cited

UNITED STATES PATENTS

| | | | |
|---|---|---|---|
| 3,211,514 | 10/1965 | Casty et al. | 8—93 |
| 2,720,517 | 10/1955 | Kartaschoff et al. | 260—195 |
| 3,114,746 | 12/1963 | Benz et al. | 260—163 |

OTHER REFERENCES

Bird, Theory and Practice of Wool Dye, 1963, 110–112.

GEORGE F. LESMES, Primary Examiner

P. C. IVES, Assistant Examiner

U.S. Cl. X.R.

8—1 E, 1 G, 1 H; 260—193